United States Patent
Fukaya (12) 
(10) Patent No.: US 11,156,624 B2
(45) Date of Patent: Oct. 26, 2021

(54) AUTOMATIC ANALYZER AND INFORMATION PROCESSING APPARATUS

(71) Applicant: HITACHI HIGH-TECH CORPORATION, Tokyo (JP)

(72) Inventor: Naohiko Fukaya, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 123 days.

(21) Appl. No.: 16/326,673

(22) PCT Filed: Aug. 4, 2017

(86) PCT No.: PCT/JP2017/028352
§ 371 (c)(1),
(2) Date: Feb. 19, 2019

(87) PCT Pub. No.: WO2018/037879
PCT Pub. Date: Mar. 1, 2018

(65) Prior Publication Data
US 2019/0187164 A1 Jun. 20, 2019

(30) Foreign Application Priority Data
Aug. 26, 2016 (JP) .............................. JP2016-165272

(51) Int. Cl.
*G06F 16/00* (2019.01)
*G01N 35/00* (2006.01)
(Continued)

(52) U.S. Cl.
CPC ....... *G01N 35/00732* (2013.01); *G01N 35/00* (2013.01); *G06F 16/245* (2019.01);
(Continued)

(58) Field of Classification Search
CPC ................ G06F 16/245; G06F 16/248; G01N 2035/00831; G01N 2035/00881;
(Continued)

(56) References Cited

U.S. PATENT DOCUMENTS

2004/0194141 A1 9/2004 Sanders
2005/0283468 A1* 12/2005 Kamvar .............. G06F 16/3325
(Continued)

FOREIGN PATENT DOCUMENTS

JP 2005217625 A 8/2005
JP 2008051723 A 3/2008
(Continued)

OTHER PUBLICATIONS

International Search Report of PCT Application No. PCT/JP2017/028352 dated Oct. 17, 2017.
(Continued)

*Primary Examiner* — Dinku W Gebresenbet
(74) *Attorney, Agent, or Firm* — Miles & Stockbridge, P.C.

(57) ABSTRACT

The present invention has been made to solve the above problem, and an object of the present invention is to provide an automatic analyzer that enables control related to a search screen display of an automatic analyzer. The automatic analyzer includes: an analysis unit 2 that analyzes a specimen, a storage unit 20 that stores specimen information including specimen IDs and a plurality of attribute information pieces recorded correspondingly for each of the specimen IDs, a priority setting unit 11 that sets attribute information to be extracted from the plurality of attribute information pieces at the time of searching the specimen information, and a screen control unit 12 that controls a screen for displaying the specimen ID which conforms to a character string of an input specimen ID as a search result
(Continued)

among the specimen information stored in the storage unit according to the character string, in which the screen control unit 12 displays specific specimen information from the specimen information stored in the storage unit as the search result on the screen, based on the attribute information set by the priority setting unit 11 and a first character string including less than the number of digits of the character string of the specimen ID when the first character string is input to the screen.

6 Claims, 7 Drawing Sheets

(51) Int. Cl.
*G06F 16/245* (2019.01)
*G06F 16/248* (2019.01)
*G06T 11/60* (2006.01)

(52) U.S. Cl.
CPC ... *G06F 16/248* (2019.01); *G01N 2035/0091* (2013.01); *G01N 2035/00831* (2013.01); *G06T 11/60* (2013.01)

(58) Field of Classification Search
CPC ........... G01N 2035/0091; G01N 35/00; G01N 35/00722; G01N 35/00732; G01N 35/0095; G06T 11/60
See application file for complete search history.

(56) References Cited

U.S. PATENT DOCUMENTS

| | | | |
|---|---|---|---|
| 2006/0259479 A1* | 11/2006 | Dai | G06F 16/9535 |
| 2007/0244863 A1* | 10/2007 | Adams | G06F 16/951 |
| 2008/0071503 A1 | 3/2008 | Fujita et al. | |
| 2009/0119289 A1 | 5/2009 | Gibbs et al. | |
| 2012/0036944 A1 | 2/2012 | Chida et al. | |
| 2012/0117088 A1* | 5/2012 | Kawakami | G16H 50/70 |
| | | | 707/749 |
| 2012/0239676 A1 | 9/2012 | Kaneko et al. | |
| 2013/0103694 A1* | 4/2013 | Luong | H04L 67/1065 |
| | | | 707/747 |
| 2013/0117042 A1* | 5/2013 | Tajima | G01N 35/0095 |
| | | | 705/2 |
| 2016/0378953 A1* | 12/2016 | Kitagawa | G16H 10/40 |
| | | | 435/287.2 |

FOREIGN PATENT DOCUMENTS

| | | |
|---|---|---|
| JP | 2014055907 A | 3/2014 |
| JP | 2016014686 A | 1/2016 |
| WO | 2010122718 A1 | 10/2010 |
| WO | 2011067888 A1 | 6/2011 |

OTHER PUBLICATIONS

Extended European Search Report dated Mar. 19, 2020 in European Application No. 17843365.2.

* cited by examiner

| CONDITION ID | CONDITION NAME | PRIORITY | ERROR | RESIDENCE TIME |
|---|---|---|---|---|
| 1 | URGENT | URGENT | | |
| 2 | SPECIMEN ERROR | | CLOGGING ERROR, SPECIMEN SHORTAGE ERROR | |
| 3 | RESULT ERROR | | UPPER LIMIT VALUE ERROR | |
| 4 | LONG RESIDENCE | | | 60 MINUTES |
| | | | | |

ADD PRIORITY CONDITION

FIG. 4

| | 211 | 212 | 213 | 214 | 215 |
|---|---|---|---|---|---|
| | CONDITION ID | CONDITION NAME | PRIORITY | ERROR | RESIDENCE TIME |
| 21 | 1 | URGENT | URGENT | | |
| | 2 | SPECIMEN ERROR | | CLOGGING ERROR, SPECIMEN SHORTAGE ERROR | |
| | 3 | RESULT ERROR | | UPPER LIMIT VALUE ERROR | |
| | 4 | LONG RESIDENCE | | | 60 MINUTES |
| | | | | | |

FIG. 5

| | 221 | 222 | 223 | 224 | 225 |
|---|---|---|---|---|---|
| | SPECIMEN ID | SPECIMEN TYPE | PRIORITY | ERROR | INPUT TIME |
| | 777001888 | SERUM | NORMAL | NONE | 12:30 |
| | 777002888 | SERUM | NORMAL | CLOGGING ERROR | 12:50 |
| 22 | 777003888 | SERUM | NORMAL | UPPER LIMIT VALUE ERROR | 12:50 |
| | 777004888 | SERUM | URGENT | NONE | 12:51 |
| | 777005888 | SPINAL FLUID | NORMAL | NONE | 12:52 |
| | 777006888 | SPINAL FLUID | NORMAL | NONE | 12:57 |

AUTOMATIC ANALYZER AND INFORMATION PROCESSING APPARATUS

TECHNICAL FIELD

The present invention relates to an automatic analyzer used in a clinical examination.

BACKGROUND ART

An automatic analyzer for automatically analyzing a specimen such blood or urine provided by a patient is used for labor saving analysis in a large number of hospitals, inspection centers, and so on. In such a device, there is a need to acquire progress information on analysis involved in a specimen in response to an inquiry from a doctor or to collect the specimen in order to deal with clogging or deficiency of the specimen. For that reason, a large number of analyzers have functions of searching the information on the specimen with an ID uniquely identifying the specimen as a search key, and displaying a progress status of analysis and collecting the specimen with respect to the specimen of the search result.

Japanese Unexamined Patent Application Publication No. 2016-14686 (Patent Literature 1) discloses a method of retrieving specimen information that completely matches a specimen ID with the specimen ID as a search key, and collecting the specimen information for the specimen.

CITATION LIST

Patent Literature

Patent Literature 1: Japanese Unexamined Patent Application Publication No. 2016-14686

SUMMARY OF INVENTION

Technical Problem

The above method is an excellent method if a character string length of the search ID is short. However, in an automatic analyzer having a long character string length of the specimen ID, there is a problem that an operator takes time and labor to input the specimen ID.

An object of the present invention is to provide an automatic analyzer that enables control related to display of search information result candidates on a specimen search screen of the automatic analyzer.

Solution to Problem

One representative aspect of the present invention is as follows.

The present invention provides an automatic analyzer including: an analysis unit that analyzes a specimen; a storage unit that stores specimen information including specimen IDs and a plurality of attribute information pieces recorded correspondingly for each of the specimen IDs; a priority setting unit that sets attribute information to be extracted from the plurality of attribute information pieces at the time of searching the specimen information; and a screen control unit that controls a screen for displaying the specimen ID which conforms to a character string of an input specimen ID as a search result among the specimen information stored in the storage unit according to the character string, in which the screen control unit displays specific specimen information from the specimen information stored in the storage unit as the search result on the screen, based on the attribute information set by the priority setting unit and a first character string including less than the number of digits of the character string of the specimen ID when the first character string is input to the screen.

Another representative aspect of the present invention provides an information processing apparatus including: a storage unit that stores specimen information including specimen IDs and a plurality of attribute information pieces recorded correspondingly for each of the specimen IDs; a priority setting unit that sets attribute information to be extracted from the plurality of attribute information pieces at the time of searching the specimen information; and a screen control unit that controls a screen for displaying the specimen ID which conforms to a character string of an input specimen ID as a search result among the specimen information stored in the storage unit according to the character string, in which the screen control unit displays specific specimen information from the specimen information stored in the storage unit as the search result on the screen, based on the attribute information set by the priority setting unit and a first character string including less than the number of digits of the character string of the specimen ID when the first character string is input to the screen.

Advantageous Effects of Invention

The present invention enables control related to display of search information result candidates and the like on a specimen search screen of an automatic analyzer.

Further features relating to the present invention will become apparent from the description of the present specification and the accompanying drawings. Further, problems, configurations, and effects other than those described above will be clarified by the description of the following embodiments.

BRIEF DESCRIPTION OF EMBODIMENTS

DESCRIPTION OF EMBODIMENTS

Hereinafter, embodiments of the present invention will be described with reference to the accompanying drawings. However, these are for understanding the present invention, and should not be used for interpret the present invention in a limited way.

In the following description, the information handled in the embodiments will be described with the use of a "table"

structure, but these pieces of information are not necessarily represented by the data structure by the table, and may be expressed by a data structure such as a list, a DB, a queue, or the like, or other structures. For that reason, in order to show that the data does not depend on the data structure, in the following description, various data is sometimes simply referred to as "information".

Figure 1:
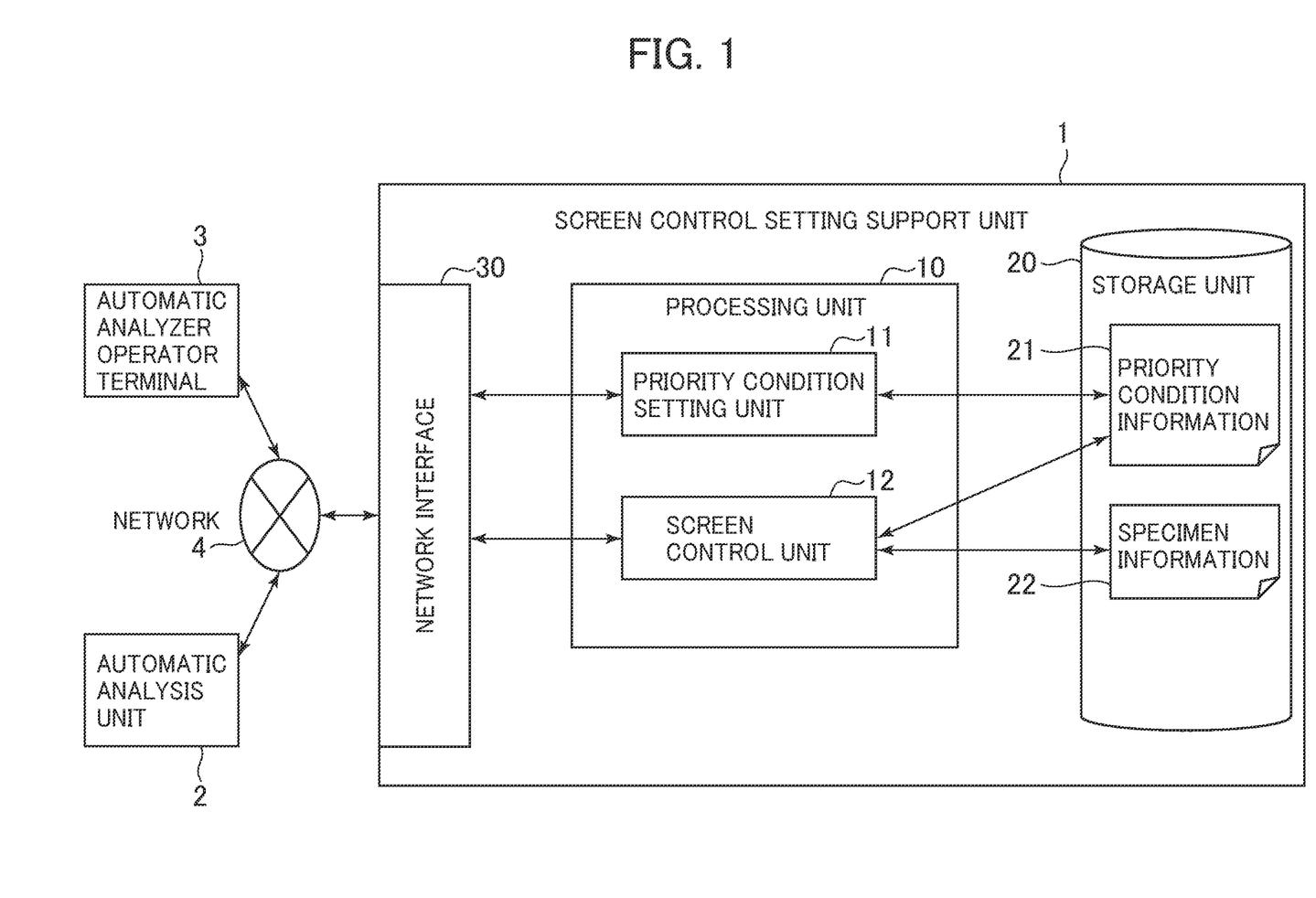
FIG. 1 is a diagram showing an example of a configuration of an automatic analyzer according to an embodiment of the present invention.

FIG. 1 is a diagram showing an example of a configuration of an automatic analyzer according to an embodiment of the present invention. As shown in FIG. 1, the automatic analyzer includes a screen control setting support unit 1, an automatic analysis unit 2 for analyzing, and an automatic analyzer operator terminal 3. The screen control setting support unit 1 is configured by an information processing device such as a computer, and includes a processing unit 10, a storage unit 20, a network interface 30, and the like. The processing unit 10 includes, as its functional blocks, a priority condition setting unit 11 and a screen control unit 12. The storage unit 20 stores priority condition information 21 and specimen information 22. The review information 22 includes specimen IDs and a plurality of attribute information pieces recorded corresponding to each specimen ID. The attribute information will be described later.

The processing unit 10 executes a program stored in the storage unit 20, to comprehensively control each component (for example, a communication unit (not shown)) and perform various arithmetic processing. Specifically, the processing unit is executed by a CPU (central processing unit). The storage unit 20 is used for permanently storing programs and data, and is configured by a hard disk or the like which is a large-capacity magnetic memory. The network interface is an interface for exchanging data through a network.

As described above, in the screen control setting support unit 1 configured by a computer, the functional blocks shown in FIG. 1 are realized by allowing the processing unit 10 to execute a predetermined program corresponding to each functional block stored in the storage unit 20. Therefore, an operation subject of each functional block of the screen control setting support unit 1 is the processing unit 10. In that case, when describing the operation of each functional block, the subject should be the processing unit, but in the present description, when describing the operation of each functional block, its functional block name is used as the subject.

Further, as shown in FIG. 1, the screen control setting support unit 1 is connected to the network 4 by the network interface 30, and further connected to a plurality of automatic analyzer operator terminals 3 used by automatic analyzer operators through the network 4. At this time, the automatic analyzer operator terminal 3 is usually configured by a computer having a CPU and a storage device, but in terms of function, the automatic analyzer operator terminal 3 is used as a display device, an input/output device, or the like of the screen control setting support unit 1. In the following description, the automatic analyzer operator terminal 3 is abbreviated as "operator terminal 3", and the automatic analyzer operator is abbreviated as "operator" as appropriate.

Further, in the present embodiment, a case where each functional block of the screen control setting support unit 1 acquires information from the operator terminal 3 through the network interface 30 and the network 4 (that is, information is input from the operator terminal 3), or outputs (displays) information to the operator terminal 3 through the network interface and the network, is simply referred to as inputting (acquiring) information from the operator terminal 3, or outputting (displaying) information to the operator terminal 3.

In the example of the configuration of the functional blocks shown in FIG. 1, the screen control setting support unit 1 is configured by one computer, but the screen control setting support unit 1 may be configured by a plurality of computers connected to each other through a network or the like. For example, each of the priority condition setting unit 11 and the screen control unit 12 may be realized on a different computer. Further, when the operator terminal 3 is configured by a computer, the function of the priority condition setting unit 11 may be realized on the operator terminal 3.

Next, an outline of the functional blocks of the screen control setting support unit 1 will be described with reference to FIG. 1. The priority condition setting unit 11 is a functional block that assists the operator to input a screen control setting. The priority condition setting unit 11 displays a setting screen on the operator terminal 3. When searching for the specimen information with the search ID as a search key, the operator sets conditions for priority display as search result candidates. The setting information is stored in the storage unit as the priority condition information 21. The screen control unit 12 is a functional block that displays on the operator terminal 3 a screen for searching for the specimen information using the specimen ID as the search key. The screen control unit 12 controls a screen for displaying, as a search result, a specimen ID that matches the character string in the specimen information stored in the storage unit according to the character string of the specimen ID input on the screen. When the operator is inputting the search ID, the screen control unit 12 displays the candidates of the search result with the use of the priority condition information.

Figure 2:
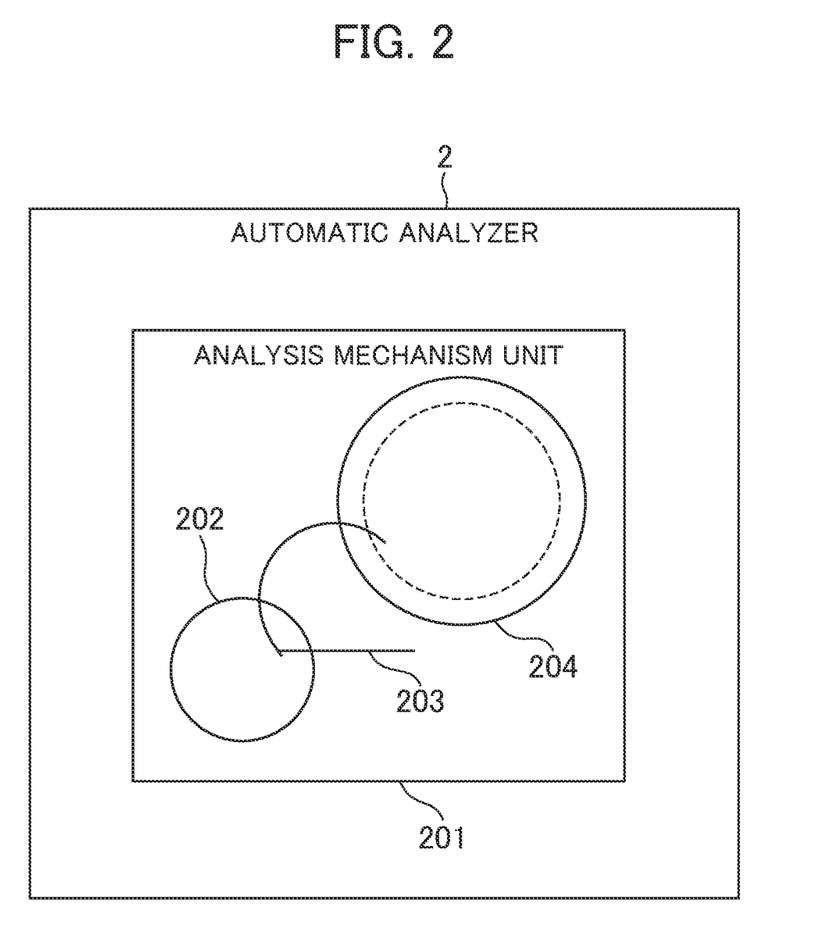
FIG. 2 is a diagram illustrating an example of a configuration of an automatic analysis unit.

Next, an outline of the function of the automatic analyzer 2 will be described with reference to FIG. 2. FIG. 2 is a diagram showing an example of the configuration of the automatic analyzer. The automatic analyzer 2 includes one or more analysis mechanism units 201 and a transfer line (not shown) for transporting the specimens. The specimen is transported to the analysis mechanism unit 201 which can perform an assigned analysis through a transport line. The analysis mechanism unit 201 suctions the specimen from a test tube and dispenses the suctioned specimen into a reaction cell 204 for performing a chemical reaction and measurement. In addition, the analysis mechanism unit 201 injects a reagent from a reagent disk 202 into the reaction cell 204 in which the specimen has been dispensed with the use of a reagent probe 203, and makes a chemical reaction. As a result, the analysis mechanism unit 201 analyzes components in the specimen according to a change in an absorbance observed by an absorbance sensor provided in the analysis mechanism unit 201.

In this example, the automatic analysis unit 2 detects clogging or a shortage of the amount of specimen in the reagent probe 203 during analysis, and when detecting an incorrect specimen, the automatic analysis unit 2 notifies the screen control unit 12 of the detected incorrect specimen as a specimen error through the network interface 30. The screen control unit 12 adds information on the specimen error to the specimen information 22 of the corresponding specimen. Further, when a value of the analysis result is out of a range of a prescribed value, the automatic analysis unit 2 notifies the screen control unit 12 of the information on the result error. The screen control unit 12 adds information on the result error to the specimen information 22 of the corresponding specimen.

Figure 3:
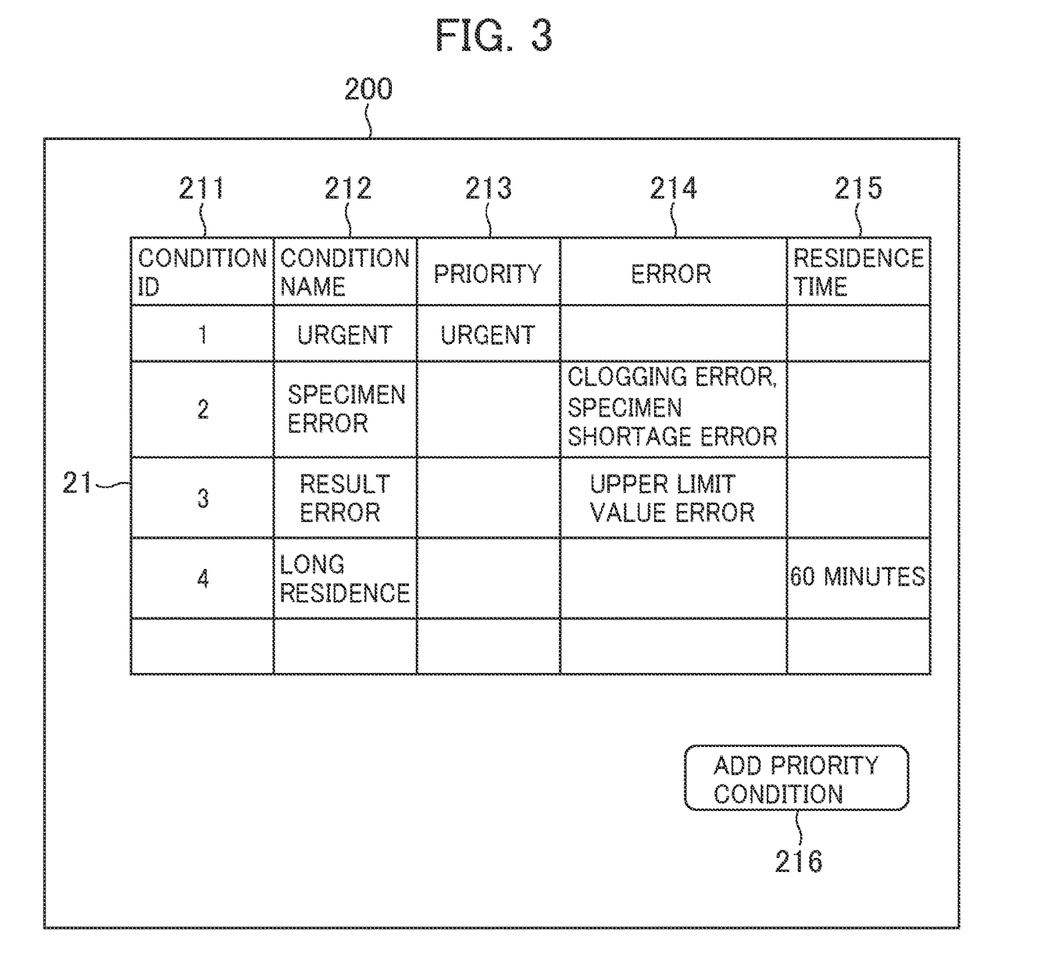
FIG. 3 is a diagram showing an example of a priority setting screen.

Next, the functions of the priority condition setting unit 11 will be described in detail with reference to FIGS. 3 and 4. FIG. 3 shows a priority condition setting screen 200 displayed on the operator terminal 3 by the priority condition setting unit 11. When modifying the priority condition information 21 already set, the priority condition setting unit 11 reads the priority condition information 21 from the storage unit 20 and causes the priority condition setting screen 200 to be displayed on the operator terminal 3.

The priority information setting unit 11 sets the attribute information to be extracted from a plurality of attribute information pieces at the time of searching the specimen information. This setting is performed by the operator through the priority condition setting screen. Since the specimen information includes the specimen IDs and a plurality of attribute information pieces recorded corresponding to each of the specimen IDs, the search result candidates can be narrowed down by setting the attribute information to be extracted.

The priority condition information 21 to be displayed on the priority condition setting screen 200 is information expressing a specific priority condition used by the screen display unit 22 to display the search result candidates. The priority condition information 21 includes a condition ID 211, a condition name 212, a priority 213, an error 214, and a residence time 215 of the specimen in the apparatus as attributes of records. In this case, an example in which as the plurality of attribute information pieces, the priority 213, the error 214, and the residence time 215 are used as conditions for displaying in priority is shown.

In this example, the condition ID 211 is an ID uniquely assigned to the priority condition information 21 by the priority condition setting unit 11. The condition name 212 is a character string to be displayed when displaying the search result candidates, and is input by the operator on the priority condition setting screen 200.

The priority 213 represents the priority of analysis and transport control in the automatic analysis unit 2 and is selected from at least two values of normal and urgent. The specimens designated by urgent are implemented earlier than the specimens designated by normal, and the analysis result of the specimens designated by urgent is first obtained.

The error 214 indicates that an error is present in the specimen. The example of the record of the condition ID2 indicates that there is clogging (clogging error) or the insufficient amount of specimen (specimen shortage error) in the reagent probe 203 during analysis, and the record of the condition ID3 shows that the value of the analysis result is larger than a range of a prescribed value (a specified range outside error of the analysis value). The attribute of the error 214 can specify a plurality of errors involved in the specimen.

The residence time 215 indicates that a time from the recognition of the specimen by the automatic analysis unit 2 to the current time is equal to or longer than an input time.

The priority condition information 21 can simultaneously input the priority, the error and the residence time, and is interpreted by a logical product of the attributes entered in one record. For example, when all of the priority 213, the error 214 and the residence time 215 are input, a specific priority is set and a specific error is present in the specimen information, the specimen stays within the automatic analysis unit for a specific time or more, and the screen control unit 12 preferentially sets the specimen information satisfying the condition as the search result candidates.

In the priority condition setting screen 200, when the operator presses a priority condition addition button 216, a record of the priority condition information 21 is added except for the condition ID 211. The condition ID 211 is set so that the priority condition setting unit 11 automatically becomes unique. In the priority condition setting screen 200, the operator inputs a value of each attribute of the newly added record. Note that the operator can also edit the record of the priority condition information already set on the priority condition setting screen 200. When the priority condition information 21 is input or corrected on the priority condition setting screen 200, the priority condition setting unit 11 stores the input or modified information in the storage unit 20.

Figure 4:
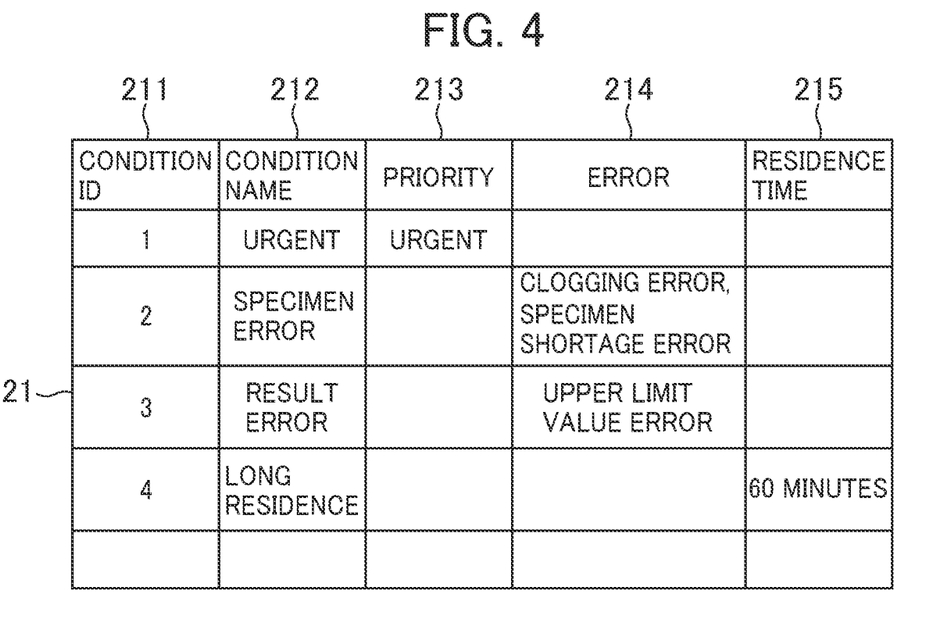
FIG. 4 is a diagram showing an example of a table for priority condition information.

FIG. 4 illustrates a table that stores priority condition information 21. As described above, the table for the priority condition information 21 includes the condition ID 211, the condition name 212, the priority 213, the error 214, and the residence time 215 as attributes.

Next, the functions of the screen control unit 12 will be described in detail with reference to FIGS. 5, 6, 7, and 8.

Figure 5:
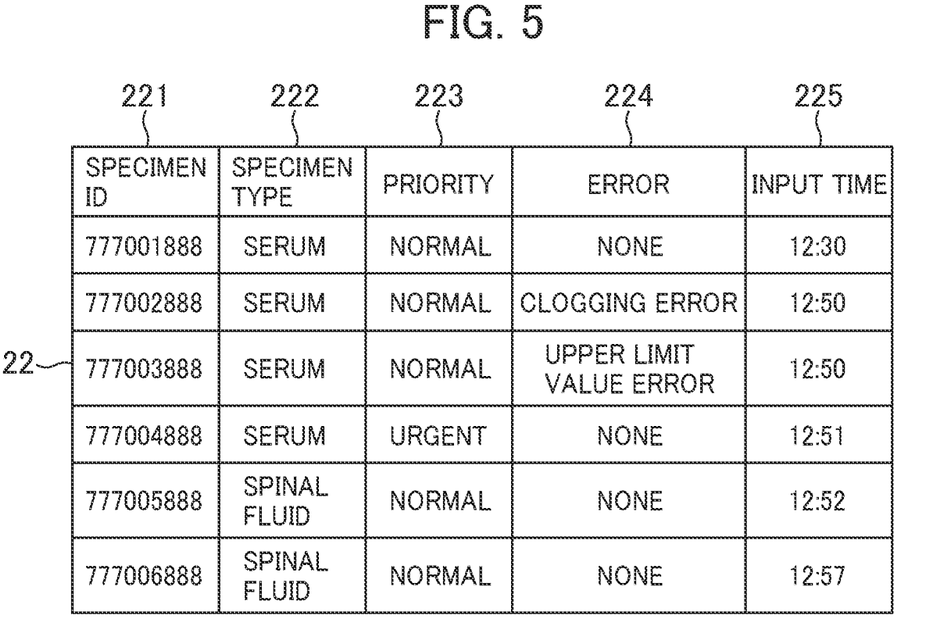
FIG. 5 is a diagram showing an example of a table for specimen information.

The screen control unit 12 generates the specimen information 22 based on the information on the specimen transmitted from the automatic analysis unit 2 through the network 4.

FIG. 5 shows a table storing the specimen information 22. The table for the specimen information 22 includes, as attributes, a specimen ID 221, a specimen type 222, a priority 223, an error 224, and an input time 225.

When the specimen is inserted, the automatic analyzer 2 notifies the screen control unit 12 of the input specimen. The screen control unit 12 generates a record of the specimen information 22. The automatic analyzer 2 reads information of a bar code stuck on a specimen container and transmits the read information to the screen control unit 12, and the screen control unit 12 sets the specimen ID 221. The specimen type 222 is set on the basis of information of a database in which a correspondence of the specimen IDs and the specimen types defined in advance is stored. The priority 223 is provided with a function so as to be able to be set by the operator from the operator terminal 3. The error 224 is set by the screen control unit 12 using the error information transmitted to the screen control unit 12 by the automatic analysis unit 2. The input time 225 sets information on which the specimen information 22 is created. Therefore, the input time 225 indicates a time at which the automatic analyzer 2 has notified the screen control unit 12 after the automatic analysis unit 2 has recognized the specimen.

In this example, the priority 223 may be set by the screen control unit 12 with the use of a database in which a correspondence between the specimen IDs 221 and the priorities defined in advance is stored. Therefore, the priority 223 may be priority information related to the priority even without using the two values of normal and urgent.

Figure 6:
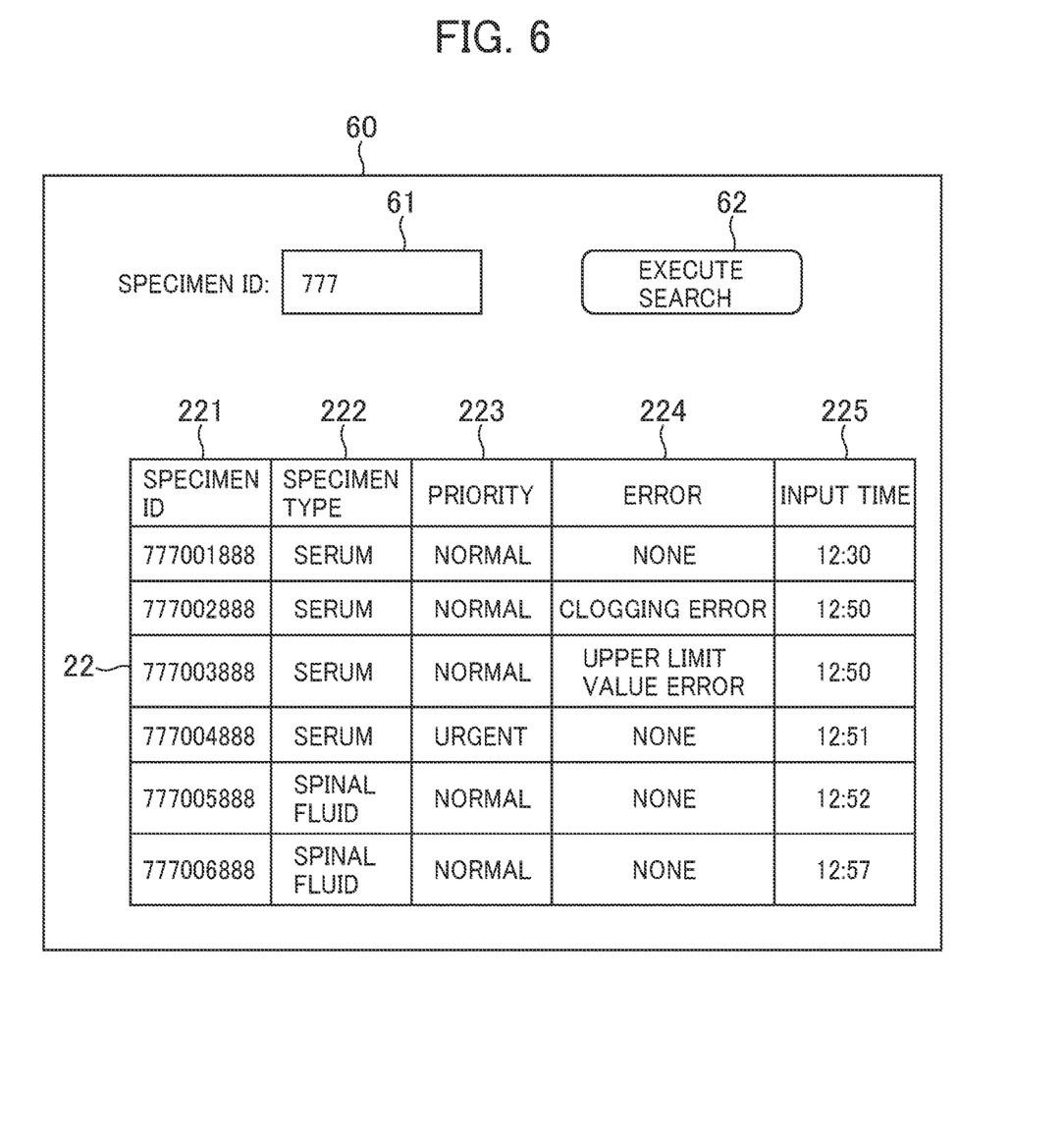
FIG. 6 is a diagram showing an example of a specimen information search screen.

FIG. 6 shows a specimen search screen 60 to be displayed on the operator terminal 3 by the screen control unit 12. When the operator inputs a specimen ID search character string 61 and presses a search execution button 62, the specimen search screen 60 displays a list of the specimen information 22 having the specimen ID 221 including an input specimen ID character string 61.

For example, when the specimen ID is a number of 9 digits, if "777" is input, specimen information including "777" in the specimen ID is displayed. In the figure, "777"

indicates the specimen ID at the head, but the specimen ID including "777" in the middle can be also extracted.

In this example, the display of the specimen information 22 is not limited to the attributes shown in FIG. 6, but the progress of the analysis (for example, analysis uncompleted, analysis document completed) and a numerical value of the analysis result, and a comment character string set in the specimen may be displayed. Alternatively, a button for instructing collection may be displayed, and the operator may press the button to instruct collection of the specimen.

Figure 7:
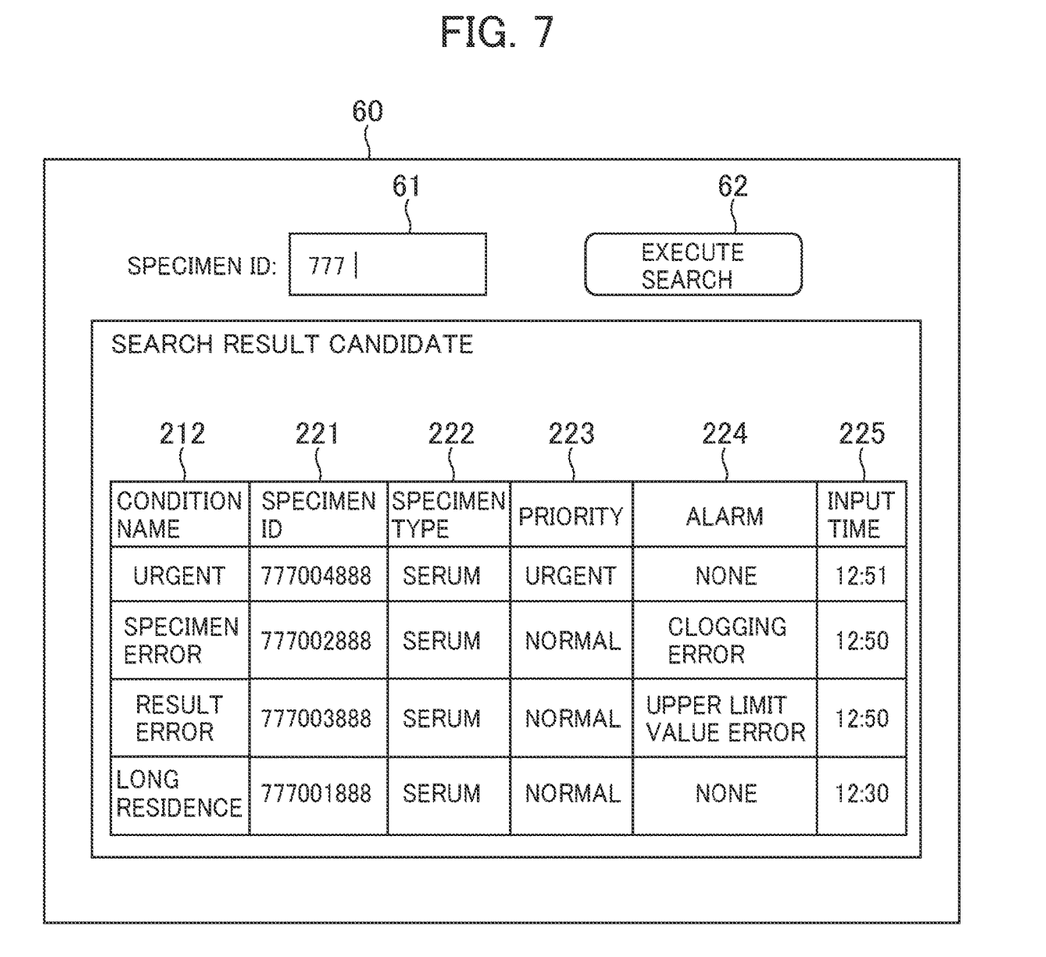
FIG. 7 is a diagram showing an example of displaying search result candidate information.

FIG. 7 shows the presentation of search candidates in the specimen information search screen 60 displayed on the operator terminal 3 by the screen control unit 12. When the specimen ID character string 61 is partially input to the screen control unit 12, the screen control unit 12 displays the specimen information 22 satisfying the condition of the priority condition information 21 which is the set attribute information in the specimen information 22 including the partially input character string as the search result candidates together with the condition name 212 of the corresponding priority condition information 21.

In other words, when the character string less than the number of digits of the specimen ID is input to the screen, the screen control unit 12 can display the specific specimen information as the search result from the specimen information stored in the storage unit on the screen based on the attribute information set by the priority condition setting unit 11 and the input character string.

For example, FIG. 7 shows an example in which the specimen information that matches any condition of the conditions ID1 to ID4 in FIG. 3 among the specimen information that matches the condition of "777" of the specimen ID is listed as the search result candidates. In this example, four pieces of specimen information are extracted. Incidentally, a setting for providing a logical expression of the condition ID can be provided separately, and searched as AND conditions of the condition ID1 to the condition ID4.

With the above configuration, the attribute information of this specimen ID can be confirmed merely by inputting "777" without inputting a number of nine digits such as "777004888".

Figure 8:
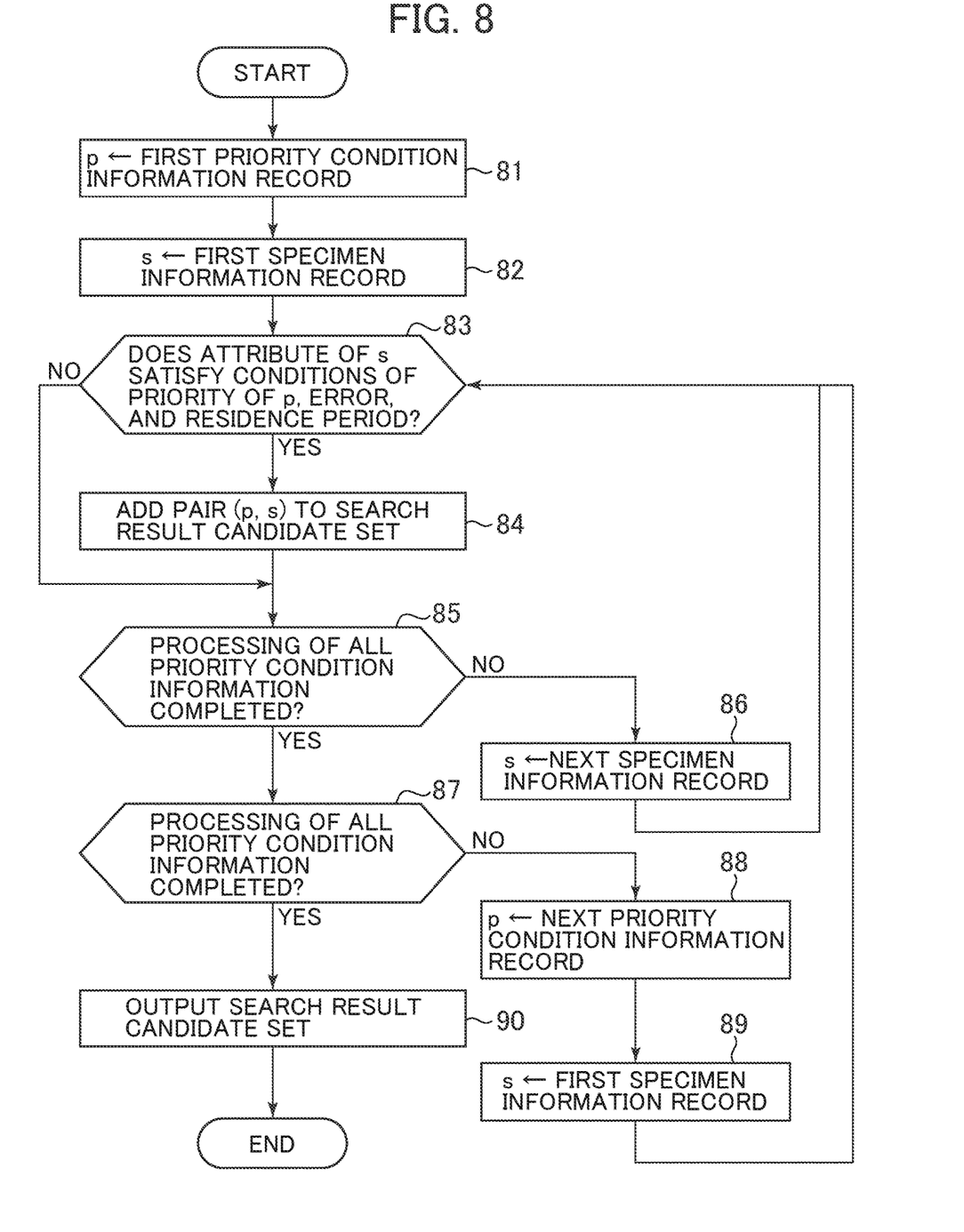
FIG. 8 is a diagram showing an example of an acquisition algorithm of the search result candidate information.

The set of the search result candidates is obtained by the following algorithm shown in FIG. 8. It is assumed that p is the record of the first priority condition information 21 (Step 81). It is assumed that s is the record of the first specimen information 22 (Step 82).

If the attribute of s satisfies the conditions of the priority 213, error 214, and residence period 215 of p (Step 83), a pair (p, s) is added to the search result candidate set (Step 84). The determination and addition processing to the search result candidates are repeated for all the specimen information 22 (Steps 85 and 86). In this example, the residence period is calculated as a difference between the input time 225 of the specimen information 22 and the current time.

Next, if all the priority condition information 21 has not been completely processed (Step 87), the p is set as the record of a next priority condition information 21 (Step 88), the s is set as a first specimen information record (Step 89), and the processing of the determination and the addition to the search result candidates (Steps 83 and 84) is again executed. If all the priority condition information 21 has been completely processed, the search result candidate set is output (Step 90), and the processing is completed.

With the algorithm described above, the screen control unit 12 can search the specimen information stored in the storage unit, include the attribute information set by the priority information setting unit, and list the specimen information corresponding to the specimen ID including a partial character string of the specimen ID as specific specimen information.

In the specimen information search screen 60, when the operator selects one or a plurality of search results (search candidates) by a mouse device, the selected specimen information is displayed as the search result.

With the above configuration, when there is information on the searched specimen in the search result candidates, the operator can display the information on the specimen to be searched without inputting all the specimen IDs 221. This makes it possible to reduce a labor of searching for the specimen information 22.

Although the search execution button 62 is provided in FIG. 7, the screen control unit 12 may acquire the input character string periodically or at the time of updating the character string, update the specific specimen information based on the newly acquired partial character string, and display the updated specific specimen information as a search result (search candidate) on the screen.

The present invention is not limited to the embodiments described above, but includes various modifications.

For example, as the attribute information, the priority, the error, and the residence time have been exemplified. In addition, gender, age, measurement request items, and measurement result values in a range of normal values may be included in the attribute information. In the attribute information, the priority may be priority information related to the priority in addition to the exemplified normal or urgent, the error may be information involved in an error such as an error code in addition to the error per se. The residence time in the apparatus may be information involved in the residence time in addition to a time per se.

For example, the embodiments described above have been described in detail for the purpose of facilitating understanding of the present invention, and are not necessarily intended to be limited to those having all the described configurations. In addition, a part of the configuration of one embodiment may be replaced by the configuration of another embodiment, and the configuration of another embodiment may be added to the configuration of one embodiment. Further, other configurations can be added, deleted, and replaced with respect to part of the configuration of each embodiment.

Further, the functional blocks, the processing unit, the processing means, and the like of the screen control setting support unit 1 and the operation terminal unit 5 may be realized in hardware by designing some or all of those components, for example, by an integrated circuit. In addition, each of the configurations, functions, and the like described above may be realized by software by interpreting and executing a program which causes a processor to realize the respective functions. Information such as programs, tables, files, and the like that realize each function can be stored in a storage device such as a memory, a hard disk, an SSD (solid state drive), or a storage medium such as an IC card, an SD card, and a DVD.

For example, a search function may be provided in the information processing apparatus having no separate analysis unit separate from the automatic analyzer. Even in that case, when a partial character string (a character string less than the number of digits of the specimen ID) less than the number of digits of the character string of the specimen ID is input to the screen, the screen control unit displays the specific specimen information as the search result from the specimen information stored in the storage unit based on the attribute information set by the priority condition setting unit and the partial character string.

In the embodiments described above, the control lines and the information lines considered to be necessary for the description are illustrated, and all the control lines and information lines are not necessarily illustrated on a product. In practice, it can be considered that almost all the configurations are mutually connected to each other.

LIST OF REFERENCE SIGNS

1: screen control setting support unit
2: automatic analyzer
3: automatic analyzer operator terminal
4: network
10: processing unit
11: priority condition setting unit
12: screen control unit
20: storage unit
21: priority condition information
22: specimen information
30: network interface
200: priority condition information setting screen
201: analysis mechanism unit
202: reagent disk
203: reagent probe
204: reaction cell
211: condition ID
212: condition name
213: priority
214: error
215: residence time
216: priority condition addition button
221: specimen ID
222: specimen type
223: priority
224: error
225: input time
60: specimen information search screen
61: specimen ID search character string
62: search execution button

The invention claimed is:

1. An automatic analyzer comprising:
a processor configured to analyze a specimen; and
a storage device that stores specimen information including specimen IDs and a plurality of attribute information pieces recorded correspondingly for each of the specimen IDs,
wherein the processor is further configured to perform priority setting of attribute information to be extracted for searching from the plurality of stored attribute information pieces at a time of searching the specimen information,
wherein the processor is further configured to control a screen for displaying the specimen ID which conforms to a character string of an input specimen ID as a search result among the specimen information stored in the storage device according to the character string,
wherein the processor is further configured to display specific specimen information from the specimen information stored in the storage device as the search result on the screen, based on the attribute information set by the priority setting and a first character string including less than the number of digits of the character string of the specimen ID when the first character string is input to the screen,
wherein the attribute information includes information relating to a residence time which is a time period starting from a time from recognition of the specimen by the processor and ending at a current time,
wherein said priority setting further comprises determining a long residence time condition based on the residence time being equal to or longer than an input specified time period, and
wherein the attribute information set by the processor in the priority setting for searching is among the specimen information stored in the storage device, and the processor is further configured to display the specimen information corresponding to the specimen ID including the first character string as the specific specimen information on the screen as a result of searching.

2. The automatic analyzer according to claim 1, wherein the attribute information further includes one of specimen priority condition information and error information.

3. The automatic analyzer according to claim 1, wherein the processor acquires the character string input to the screen periodically or when updating the character string, and updates the specific specimen information based on the first character string newly acquired, and displays the updated specific specimen information as a search result on the screen.

4. The automatic analyzer according to claim 2, wherein the priority condition information includes at least two values of normal and urgent.

5. The automatic analyzer according to claim 2, wherein the error information includes at least one of clogging error, specimen shortage error, and a specified range outside error of an analysis value.

6. An information processing apparatus comprising:
a storage device that stores specimen information including specimen IDs and a plurality of attribute information pieces recorded correspondingly for each of the specimen IDs; and
a processor configured to perform priority setting to set attribute information for searching to be extracted from the plurality of attribute information pieces at a time of searching the specimen information,
wherein the processor is further configured to control a screen for displaying the specimen ID which conforms to a character string of an input specimen ID as a search result among the specimen information stored in the storage device according to the character string, and
wherein the processor displays specific specimen information from the specimen information stored in the storage device as the search result on the screen, based on the attribute information set by the priority setting and a first character string including less than the number of digits of the character string of the specimen ID when the first character string is input to the screen,
wherein the attribute information includes information relating to a residence time which is a time period starting from a time from recognition of the specimen by the processor and ending at a current time,
wherein said priority setting further comprises determining a long residence time condition based on the residence time being equal to or longer than an input specified time period, and
wherein the attribute information set by the processor in the priority setting for searching is among the specimen information stored in the storage device, and the processor is further configured to display the specimen information corresponding to the specimen ID including the first character string as the specific specimen information on the screen as a result of searching.

* * * * *